G. D. WALDO.
Smut Machine.
No. 2,421.
Patented Jan'y 17, 1842.
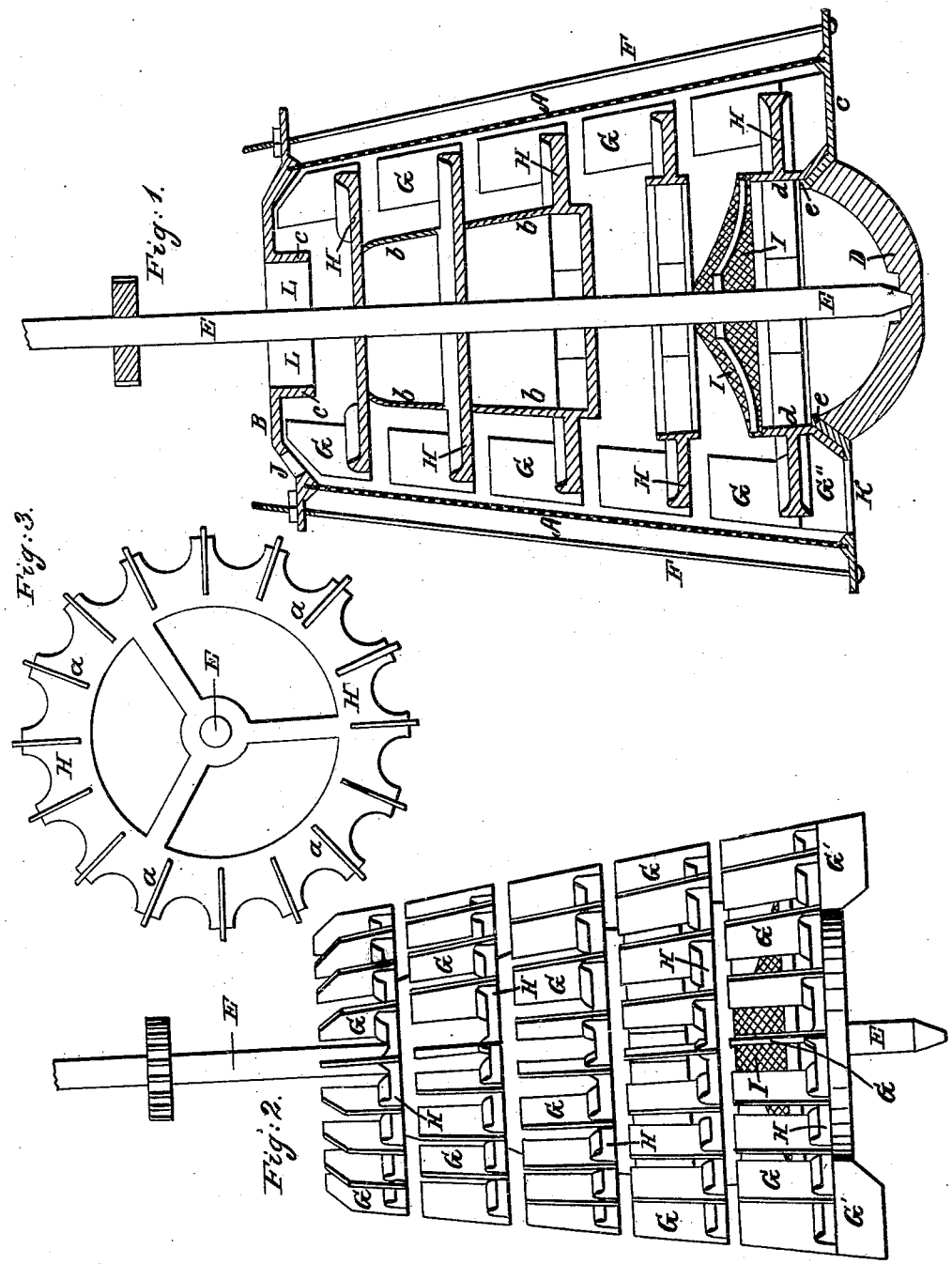

UNITED STATES PATENT OFFICE.

GEORGE D. WALDO, OF LOCKPORT, NEW YORK.

SMUT-MACHINE.

Specification of Letters Patent No. 2,421, dated January 17, 1842.

*To all whom it may concern:*

Be it known that I, GEORGE D. WALDO, of Lockport, in the county of Niagara and State of New York, have invented certain Improvements in the Machine for Cleaning Grain, usually denominated a "Smut-Machine"; and I do hereby declare that the following is a full and exact description thereof.

My machine, in its general construction, resembles some others which have been invented, and used for the same purpose, but I have made certain improvements therein by which it is rendered more efficient in its operation than those heretofore employed. The general form of the exterior of my machine is that of a frustum of a cone, which may, in one of ordinary size, be about twenty inches in diameter at its upper, and thirty two inches at its lower, end; and about three feet six inches, or four feet, in height. The outer shell, or case, may be made either of wrought or of cast iron; I usually make it of sheet iron, through which I cut, or punch, with a wide chisel, numerous holes, or slots, that will raise a bur, or projecting edge, on the interior surface of the case, thus forming numerous edges of that description, and leaving numerous apertures of sufficient width for the escape of dust, but not allowing of the passing of grain. A similar result may be attained by forming the exterior shell of slats of cast-iron having spaces between them for the escape of dust, but not admitting the grain to pass through such cases, or shells, are not claimed as new, having been used under various modifications, all designed to produce the same result; and my intention is to use any of these which suit my purpose, while I do not interfere with the rights of others, but which may be considered as public property.

Within the exterior shell, or case, of this machine I place a system of revolving wings, vanes, or beaters, so arranged as to correspond with the form of the case, or shell, and which are to operate upon the grain in its passage from the feeding aperture at the top, to the escape aperture at the lower end of the machine. I usually employ five tiers of wings, or beaters, and there may be sixteen wings, more or less, in each tier.

In the accompanying drawing, Figure 1, represents a vertical section of my machine through its axis; and Fig. 2, shows the system of revolving wings, or beaters, in perspective.

A, A, Fig. 1, is the perforated, exterior case, or shell; B, a cast-iron head, or top, and C, a cast-iron bottom, to which is attached the bridge tree D, sustaining the step of the shaft E. The top and bottom may be held together by screw-rods F, F.

The wings, or beaters, are shown at G, G, in both figures. These wings I usually make of sheet-iron, and they are each, ordinarily, about eight, or nine, inches long, and about four inches wide. At their lower edges they are held by disks, or flat rings, of cast-iron, H, H; the pieces which are to form the wings being inserted into the flask at the time of casting the rings, or disks; in Fig. 3, H, H, is a top view of one of these rings, the lines $a$, $a$, showing the parts in which the wings are inserted, and E', the hole through which the shaft passes. The rings, or disks, and the wings also, may be wholly of cast-iron, and may be cast together, each tier forming one piece, especially if malleable cast-iron be employed, but I prefer the making the wings of wrought-iron.

The tiers of wings thus formed are to be attached to the shaft E, by suitable keys, or in any other convenient mode. The two lower tiers of wings may be inserted in flat rings, with spokes, or arms, leaving spaces between them for the passage of air; the three others may be disks, or plates, as it is not intended that air shall pass up thrugh them, the part $b$, $b$, $b$, $b$, of the revolving body being a solid cone of wood, or an inclosure formed of metal; and this may be extended down to the fourth tier, but it is deemed best to leave the two lowermost open for the free passing up of air from the opening through the bottom plate, which opening is crossed by the bridge tree, as through this opening the whole quantity of air is supplied which, with the dust, is driven through the apertures in the external case, by the action of the vanes. In placing the tiers of disks upon the shaft 3, the wings which they carry are not allowed to stand in a straight line one above the other, but they are made to break joints, the wings in a lower tier standing back an inch, or an inch and a half, more or less, behind those of the tier next above them, throughout the whole series; by which arrangement the wings, or beaters, are made to strike a much more numerous succession of blows upon the grain than can be effected by beaters running in continued lines. Each of the wings is, also, made to incline a little back from its lower to its upper end, so as to form an obtuse angle with the horizon, the sloping back being in a direction the reverse of its motion, and it is, consequently, made to strike the grain upward in a slight degree, and thus to prevent its rapid descent.

The opening in the bottom, C, is covered in the interior by a cap of wire-gauze I, I, the meshes of which are sufficiently large to allow air to pass freely through them while they retain the grain. The feeding is effected through an opening J, at the top, and the grain passes out through an opening at K, in the bottom. Wings G', G', descend from the lower disk, and pass around in the space G², carrying the grain which has descended, and which rests on the bottom, so as to cause it to pass out at the opening K. I sometimes leave openings through the top B, around the shaft E, as at L, L, and allow a rim c, c, to descend from said top to keep the grain from being thrown into the center at that part; but this arrangement is of little importance, the great supply of air being from below, and the centrifugal action throwing the grain outward. A rim d, d, descends from the lower revolving ring, embracing a rim e, e, on the bottom, and this, with the wire-gauze I, I, prevents the passing of grain through the opening in the bottom above the bridge tree. The shaft E, E, is made to revolve rapidly, say four hundred times in a minute; the vanes, or beaters, G, G, create a strong current, while they at the same time beat the grain forcibly and repeatedly; by which it is thoroughly cleaned before it reaches the bottom, the dust being blown out through the apertures in the outer case.

Having thus, fully described the construction of my improved machine for cleaning grain, and shown how the same operates, what I claim therein as new, and desire to secure by Letters Patent, is—

1. The manner of arranging the several tiers of vanes or beaters, one above the other, in a vertical case, made in the form of the frustum of a cone, so that the respective tiers shall increase in diameter in the descending series; and with the vanes of each successive tier, in descending, breaking joints with, or standing behind, the vanes in the tier above it; and this arrangement of the vanes I claim only as being combined in a machine in which the grain is fed in at the top, and is discharged at the bottom, and which is otherwise formed and arranged as herein set forth.

2. I also claim, in combination therewith, the employing of the wire gauze cap I, I, for admitting the air, and for preventing the grain from passing through the opening in the middle of the bottom of the machine.

I do not claim the giving an inclination to the vanes for the purpose of beating the grain upward, and thereby retarding its descent, as in very rapid motions this would not be necessary, and when it is resorted to such inclination is but slight; a like device has also been previously resorted to in some of the long vanes, or beaters, which have been employed in smut machines, their upper ends having been so inclined backward.

GEO. D. WALDO.

Witnesses:
 THOS. P. JONES,
 C. S. HUNT.